(12) United States Patent
Ridhuan et al.

(10) Patent No.: US 12,541,757 B1
(45) Date of Patent: Feb. 3, 2026

(54) METHODS AND APPARATUS FOR PROVIDING INFORMATION SECURITY BY LIMITING ACCESS TO DATA USING ZERO-KNOWLEDGE PROOFS (ZKPS)

(71) Applicant: EYGS LLP, London (GB)

(72) Inventors: Mohammed Ilyas Ridhuan, London (GB); Miranda Vida Concepcion Wood, London (GB)

(*) Notice: Subject to any disclaimer, the term of this patent is extended or adjusted under 35 U.S.C. 154(b) by 0 days.

(21) Appl. No.: 18/528,959

(22) Filed: Dec. 5, 2023

Related U.S. Application Data

(60) Provisional application No. 63/386,035, filed on Dec. 5, 2022.

(51) Int. Cl.
G06Q 20/36 (2012.01)

(52) U.S. Cl.
CPC .............................. G06Q 20/3678 (2013.01)

(58) Field of Classification Search
CPC .................... G06Q 20/00–425; H04L 9/00–50
See application file for complete search history.

(56) References Cited

U.S. PATENT DOCUMENTS

| | | | |
|---|---|---|---|
| 10,951,490 B2 | 3/2021 | Kumaran | |
| 11,146,399 B2 | 10/2021 | Westland et al. | |
| 11,232,439 B2 | 1/2022 | Westland | |
| 11,316,691 B2 | 4/2022 | Westland | |
| 11,502,838 B2 | 11/2022 | Connor | |
| 2020/0057362 A1 | 2/2020 | Wu | |
| 2020/0059361 A1* | 2/2020 | Konda | H04L 63/123 |
| 2020/0059364 A1* | 2/2020 | Konda | H04L 63/123 |
| 2020/0127833 A1* | 4/2020 | Konda | H04L 63/00 |
| 2020/0127834 A1* | 4/2020 | Westland | H04L 9/3221 |
| 2020/0322154 A1* | 10/2020 | Konda | H04L 9/30 |
| 2020/0328890 A1* | 10/2020 | Connor | G06Q 20/223 |
| 2020/0328893 A1* | 10/2020 | Westland | H04L 63/123 |
| 2020/0328894 A1* | 10/2020 | Baker | H04L 9/3239 |
| 2021/0042746 A1* | 2/2021 | Westland | G06F 16/2379 |
| 2021/0150626 A1* | 5/2021 | Robotham | H04L 63/0442 |
| 2021/0326872 A1* | 10/2021 | Robotham | G06Q 10/083 |

* cited by examiner

*Primary Examiner* — Ari Shahabi
(74) *Attorney, Agent, or Firm* — COOLEY LLP

(57) ABSTRACT

A non-transitory, processor-readable medium storing instructions that executed by a processor, cause the processor to generate a new zero-knowledge proof (ZKP) for a transaction based on a correctness of a prior ZKP and a prior transaction. The processor is caused to generate a ZKP using data for a first transaction and embed that data into data of a second transaction, to generate a ZKP for the second transaction. The generated ZKPs can be verified by a smart contract on a distributed ledger network that executes the second transaction based on the verification of the ZKP of the second transaction, which in turn is verified if the ZKP of the first transaction is verified.

19 Claims, 8 Drawing Sheets

500

Receive a first request that includes a first preimage of data from the first request 502

Generate a first zero-knowledge proof (ZKP) based on the first request, the first ZKP configured to anonymize the first preimage and be posted on a ledger of a zero-knowledge proof (ZKP)-enabled distributed ledger-based network (DLN) 504

Receive a second request that includes a second preimage of data from the second request 506

Embed at least a portion of the first preimage in the second request 508

Generate a second ZKP based on the second request, the second ZKP configured to anonymize the second preimage and be posted on the ledger of the distributed ledger ZKP-enabled DLN 510

Transmit the first ZKP and the second ZKP to the ZKP-enabled DLN 512

Receive, at a zero-knowledge proof (ZKP)-enabled distributed ledger-based network (DLN), (1) a first ZKP associated with a first request, the first request including a first preimage of data from the first request and (2) a second ZKP associated with a second request, the second request including at least a portion of the first preimage associated the first request and a second preimage, the first request and the second request linked based on the at least a portion of the first preimage 602

Automatically verify the second ZKP 604

Automatically execute the second request associated with the second ZKP, in response to automatically verifying the second ZKP 606

Verify the second request, based on a hash value associated with the second request 604a Verify a transaction, based on the verification of the second request and a hash value associated with the transaction and associated with the first ZKP, to verify the second ZKP 604b

700

Receiving, via a processor of a compute device included in a zero-knowledge proof (ZKP)-enabled distributed ledger-based network (DLN) and from a remote compute device, a representation of a first ZKP and a representation of a first request that includes a first preimage of data associated with the first request 702

Verifying, via the processor, the representation of the first ZKP and the first request 704

In response to the verifying of the representation of the first ZKP and the first request, automatically causing, via the processor, a first smart contract to execute the first request 706

Receiving, via the processor and from the remote compute device, a representation of a second ZKP and a representation of a second request that includes the first preimage and a second preimage of data associated with the second request, the first request and the second request linked based on the first preimage 708

Verifying, via the processor, the representation of the second ZKP and the second request 710

In response to the verifying of the representation of the second ZKP and the second request, automatically causing, via the processor, a second smart contract to execute the second request 712

FIG. 7

METHODS AND APPARATUS FOR PROVIDING INFORMATION SECURITY BY LIMITING ACCESS TO DATA USING ZERO-KNOWLEDGE PROOFS (ZKPS)

CROSS REFERENCE TO RELATED APPLICATIONS

This application claims priority to U.S. Provisional Application No. 63/386,035, filed on Dec. 5, 2022, which is hereby incorporated by reference in its entirety.

FIELD

The present disclosure generally relates to the field of distributed ledger. In particular, the present disclosure is directed to methods and apparatus for providing information security by limiting access to data using ZKPs.

BACKGROUND

Private networks as well as public networks such as distributed ledger-based networks (DLNs) are used to track and verify transaction of assets. For example, to verify parties involved in a transaction, the parties can use a zero-knowledge proof (ZKP) to prove validity of a transaction without revealing the transaction itself. In a DLN, such as a blockchain, multiple computing nodes can be used to maintain, validate and/or verify the transaction and any previous transactions that may have occurred before the transaction. Verifiability of transactions, however, only attest to the validity of the transactions themselves. The reconciliation of DLN transactions is desirable to ensure the appropriate ordering of transaction executions has taken place, prior to executing a new transaction. Ensuring the appropriate ordering of transaction executions, however, was previously possible when all information about the transactions was publicly available, compromising the privacy of the parties involved and the transactions themselves. Thus, a need exists to reconcile DLN transactions without compromising privacy is needed.

SUMMARY

In some embodiments, an apparatus includes a processor and a memory operatively coupled to the processor. The memory stores instructions to cause the processor to receive a first request that includes a first preimage of data from the first request. The memory stores instructions to further cause the processor to generate a first zero-knowledge proof (ZKP) based on the first request, where the first ZKP is configured to anonymize the first preimage and be posted on a ledger of a zero-knowledge proof (ZKP)-enabled distributed ledger-based network (DLN). The memory stores instructions to further cause the processor to receive a second request that includes a second preimage of data from the second request. The memory stores instructions to further cause the processor to embed at least a portion of the first preimage in the second request, and generate a second ZKP based on the second request. The second ZKP is configured to anonymize the second primage and be posted on the ledger of the distributed ledger of the ZKP-enabled DLN. The memory stores instructions to further cause the processor to transmit the first ZKP and the second ZKP to the ZKP-enabled DLN.

In some embodiments, a non-transitory, processor-readable medium stores instructions that when executed by a processor, cause the processor to receive, at a zero-knowledge proof (ZKP)-enabled distributed ledger-based network (DLN), (1) a first ZKP associated with a first request, where the first request includes a first preimage of data from the first request and (2) a second ZKP associated with a second request, where the second request includes at least a portion of the first preimage associated the first request and a second preimage. The first request and the second request linked based on at least a portion of the first preimage. The instructions further cause the processor to automatically verify the second ZKP. The instructions to verify the second ZKP further including instructions to verify the second request, based on a hash value associated with the second request, and verify the transaction, based on the verification of the second request and a hash value associated with the transaction and associated with the first ZKP, to verify the second ZKP. The instructions further cause the processor to automatically execute the second request associated with the second ZKP, in response to automatically verifying the second ZKP.

In some embodiments, a method includes receiving, via a processor of a compute device included in a zero-knowledge proof (ZKP)-enabled distributed ledger-based network (DLN) and from a remote compute device, a representation of a first ZKP and a representation of a first request that includes a first preimage of data associated with the first request. The method further includes verifying, via the processor, the representation of the first ZKP and the first request. The method further includes, in response to the verifying, automatically causing, via the processor, a first smart contract to execute the first request. The method further includes receiving, via the processor and from the remote compute device, a representation of a second ZKP and a representation of a second request that includes the first preimage and a second preimage of data associated with the second request. The first request and the second request are linked based on the first preimage. The method further includes verifying, via the processor, the representation of the second ZKP and the second request. The method further includes, in response to the verifying, automatically causing, via the processor, a second smart contract to execute the second request.

BRIEF DESCRIPTION OF THE DRAWINGS

FIG. 5 shows a flowchart of a method to generate ZKPs based on requests, according to an embodiment.

FIGS. 6A-6B show a flowchart of a method to execute a request in response to verifying a ZKP, according to an embodiment.

FIG. 7 shows a flowchart of a method to execute smart contracts to execute requests in response to verifying ZKPs and the requests, according to an embodiment.

DETAILED DESCRIPTION

Figure 1:
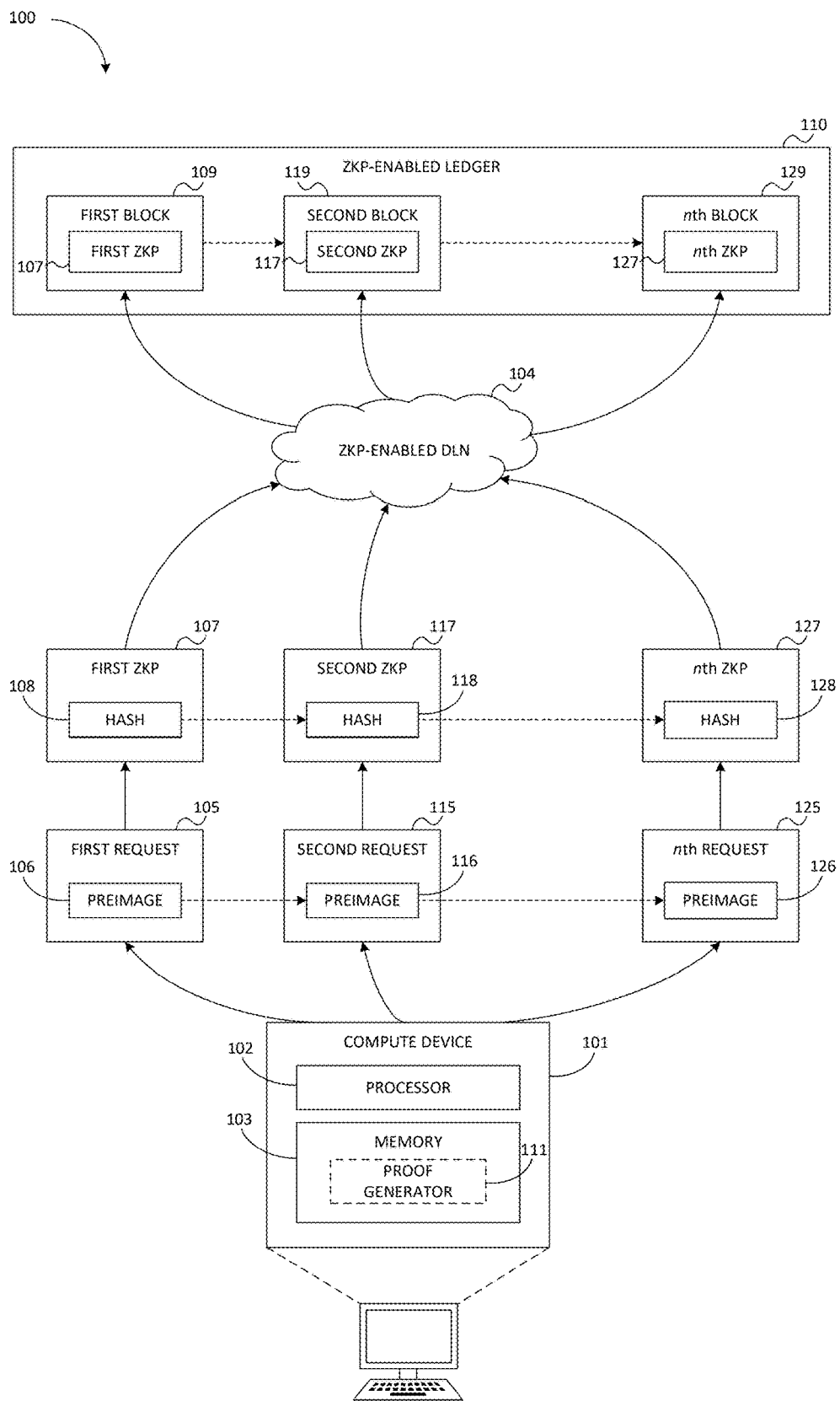
FIG. 1 is a flow diagram of a system for forming verifiably correct zero-knowledge proofs that are based on prior transactions, according to an embodiment.

In some embodiments, participants of a distributed ledger-based network (DLN) can conduct a variety of activities without the supervision of a central authority, such activities including but not limited to exchanging digital assets, managing the transfer of real world physical assets between the participants by using asset tokens as representations of the assets and their transfers on the DLNs, etc. For example, token commitments can be used to represent on the DLN a physical off-the-blockchain asset; the transfer of the physical asset from a first participant to a second participant of the DLN can be represented on the DLN by the invalidation of the token commitment that assigned ownership of the physical asset to the first participant and by the registration on the DLN of a new token commitment that assigns ownership of the physical asset to the second participant. In some instances, the DLN can also manage supply chain contracts between multiple participants. One party can include a transaction verified by a zero-knowledge proof (ZKP) that goods have been sent to a counterparty as part of a separate transaction verified by a ZKP to transmit an invoice to the counterparty for payment of the goods. This is so, at least in part so that both parties understand that the only way the transaction that transmit the invoice could exist is if the goods themselves were transferred.

In some embodiments, an apparatus can generate a ZKP for a transaction that attests the validity of the transaction. In some implementations, the apparatus can generate a ZKP to obfuscate details of the transaction to ensure privacy. The apparatus can generate new ZKPs and new transactions based on the correctness of a prior transaction and its associated proof while maintaining anonymity of parties involved in the transactions and data of the transactions themselves. For instance, the apparatus can embed (e.g., concatenate, create an output that is a function of, and/or the like) at least a portion of data of a transaction (also referred to as a "preimage") into a preimage of a subsequent transaction, enabling a ZKP of an initial transaction and a ZKP of the subsequent transaction to be linked on a DLN. In other words, at least a portion of preimage of an initial transaction is included in the preimage of a subsequent transaction, and that the at least a portion of the preimage of the initial transaction is used and/or modified such that it is not substantially easily recoverable from the preimage of the subsequent transaction once that preimage and the subsequent transaction is formed. This is so, at least in part, to create a link (e.g., relationship, association, connection, commonality, correspondence, and/or the like) between the initial transaction and the subsequent transaction that appears unrelated. While the two transactions appear unrelated, they can be linked and represented on a distributed ledger. The apparatus can generate two or more separate transactions that publicly appear unrelated, to be linked in a way that a smart contract of the DLN can validate and/or verify correctness of previous transactions and a subsequent (or final) transaction automatically (e.g., without human intervention). In some implementations, the apparatus generates ZKPs to ensure that a later transaction is executable, via the smart contract, based on verified ZKPs for any prior transactions being validated and/or verified.

In some embodiments, a self-executing code or program (also referred to as a "smart contract") can be used to manage transactions between DLN participants on the DLN. In particular, smart contracts can be used (e.g., executed) to facilitate transactions that are in response to a validation and/or correctness of ZKPs for those transactions. For example, parties participating in a transaction for a sale of a digital music file can use a smart contract on the DLN to manage the sale of the music file. The smart contract can regulate the exchange of the music file and the correct payment for the file between the parties without involvement from a third party (e.g., central authority). For instance, the smart contract can be triggered to execute a validation or be configured to validate and/or verify the music file, previous exchanges of the music file, owners and/or previous owners of the music files, previous payments of the music files, etc., prior to executing the exchange of the music file and a transfer of the payment.

In some implementations, the DLN can comprise multiple computing nodes, such that any actions undertaken on the DLN, such as transactions between participants of the DLN, can be recorded on all or nearly all of the ledgers that are stored on the multiple computing nodes after at least a sufficient number of the computing nodes (or their owners) agree on the validity of the transactions. Ledgers of the DLN can be immutable or nearly immutable in the sense that to alter the ledgers, at least a sufficient portion of the computing nodes would have to agree, which can be increasingly difficult when the number of computing nodes is large (and the distributed ledger gets longer). For instance, at least a substantial portion of the computing nodes would have to agree to a validation and/or correctness of a ZKP for the transaction to be executed.

In one or more embodiments, two transactions, transaction A and transaction B (e.g., occurring at the same time, occurring at different times), are each associated with a ZKP. Each ZKP can be configured to encapsulate and anonymize sensitive data (a preimage) pertaining to each transaction. For instance, once the ZKP is generated for a transaction, the contents of the transaction, e.g., the preimage, is anonymized. This is so, at least in part, for the ZKP to attest to the existence and/or correctness of the transaction and/or the preimage without revealing what the preimage is, including, for example, who (or what) the owner and/or recipient of the transaction is, when the transaction occurred, what was exchanged during the transaction, and/or the like.

Once transaction A is executed via a smart contract from a DLN, to enable execution of a subsequent transaction, i.e., transaction B, an apparatus can embed at least a portion of the preimage of transaction A into the preimage of transaction B, creating a direct and/or indirect link between transaction A and transaction B. The ZKP for transaction B can be verified on the DLN, where verifying the ZKP for transaction B also attests to the correctness of transaction B and transaction A, to automatically (e.g., without human intervention) execute transaction B via the smart contract.

In some implementations, a preimage, request, ZKP, or any information associated therewith can be anonymized. In some implementations, only a portion of a preimage (e.g., that portion that is to be embedded in a different transaction) is anonymized (e.g., and other data such as the request, ZKP, and/or portions of the preimage not to be embedded in the different transaction is non anonymized).

In some implementations, techniques described herein use ZKPs. In some implementations, the level of privacy and security available on DLNs (e.g., private or public DLNs) may be enhanced via the implementation of zero-knowledge proofs (ZKPs) in the DLNs. In some implementations, a ZKP-enabled DLN may provide at least increased level of privacy to transaction participants while still retaining the level of trust that is afforded by decentralized networks (i.e., with no central authority). For instance, a ZKP-enabled DLN (e.g., ZKP-enabled public DLN or blockchain) can be used to facilitate a transaction without revealing publicly or to other participants of the ZKP-enabled DLN details of the transaction such as but not limited to identities of the transacting parties, the assets being transferred as part of the transaction, the tokens representing the assets on the ZKP-enabled DLN (e.g., fungible or non-fungible tokens representing assets on the ZKP-enabled DLN), and/or the like.

In some implementations, techniques described herein use preimages. In some implementations, a preimage can refer to data that is input into a hash function to calculate a hash. The hash function can be a one-way function and the output, the hash, does not reveal the input, the preimage.

FIG. 1 is a flow diagram of a system 100 for forming verifiably correct ZKPs that are based on prior transactions, according to an embodiment. The system 100 can include a compute device 101, ZKP-enabled distributed ledger (DL) 110 and a ZKP-enabled DLN 104 that includes the ZKP-enabled ledger 110 and multiple instances or copies of the ZKP-enabled ledger 110 for each computing node (not shown in FIG. 1) comprising the ZKP-enabled DLN 104. The ZKP-enabled DLN 104 can include any DLN as described herein. In some cases, the ZKP-enabled DLN 104 can include a public and/or private DLN. The ZKP-enabled DLN 104 can also be referred to as a "blockchain network." The ZKP-enabled ledger 110 can also be referred to as a "ledger," a "distributed ledger instance," a "blockchain," or a "blockchain instance." In some implementations, the ZKP-enabled ledger 110 can include an instance of a centralized distributed ledger, a decentralized ledger, a public distributed ledger, a private distributed ledger, and/or the like.

The compute device 101 includes a processor 102 and a memory 103 that communicate with each other, and with other components, via a bus (not shown in FIG. 1). The bus can include any of several types of bus structures including, for example, a memory bus, a memory controller, a peripheral bus, a local bus, and any combinations thereof, using any of a variety of bus architectures. The compute device 101 can include, for example, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. The compute device 101 can also include multiple compute devices that can be used to implement a specially configured set of instructions for causing one or more of the devices to perform any one or more of the aspects and/or methodologies of the present disclosure.

The compute device 101 can include a network interface (not shown in FIG. 1). A network interface can be used for connecting the compute device 101 to one or more of a variety of networks and one or more remote devices connected thereto. In other words, although not shown in FIG. 1, the various devices including computer device 101 can communicate with other devices via a network(s). Examples of a network include, for example, a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, the network can be a wireless network such as, for example, a Wi-Fi or wireless local area network ("WLAN"), a wireless wide area network ("WWAN"), and/or a cellular network. In other instances, the network can be a wired network such as, for example, an Ethernet network, a digital subscription line ("DSL") network, a broadband network, and/or a fiber-optic network. In some instances, the network can use Application Programming Interfaces (APIs) and/or data interchange formats (e.g., Representational State Transfer (REST), JavaScript Object Notation (JSON), Extensible Markup Language (XML), Simple Object Access Protocol (SOAP), and/or Java Message Service (JMS)). The communications sent via the network can be encrypted or unencrypted. In some instances, the network can include multiple networks or subnetworks operatively coupled to one another by, for example, network bridges, routers, switches, gateways and/or the like.

The processor 102 can include (or be), for example, a hardware based integrated circuit (IC), or any other suitable processing device configured to run and/or execute a set of instructions or code. For example, the processor 102 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 102 can be configured to perform any of the methods and/or portions of methods discussed herein.

The memory 103 can be or include, for example, a random-access memory (RAM), a memory buffer, a hard drive, a read-only memory (ROM), an erasable programmable read-only memory (EPROM), and/or the like. In some instances, the memory can store, for example, one or more software programs and/or code that can include instructions to cause the processor 102 to perform one or more processes, functions, and/or the like. In some implementations, the memory 103 can include extendable storage units that can be added and used incrementally. In some implementations, the memory 103 can be a portable memory (e.g., a flash drive, a portable hard disk, and/or the like) that can be operatively coupled to the processor 102. In some instances, the memory 103 can be remotely operatively coupled with a compute device (not shown). For example, a remote database device can serve as a memory and be operatively coupled to the compute device. The memory 103 can include various components (e.g., machine-readable media) including, for example, a random-access memory (RAM) component, a read only component, and any combinations thereof. In one example, a basic input/output system (BIOS), including basic routines that help to transfer information between elements within the compute system 101, such as, for example, during start-up, can be stored in the memory 103. The memory 103 can further include any number of program modules including, for example, an operating system, one or more application programs, other program modules, program data, and any combinations thereof.

The memory 103 of the compute device 101 can include an optional proof generator 111. The proof generator 111 can be or include software and/or a hardware device configured to generate ZKPs for requests. The memory 103 of the compute device 101 can receive multiple requests (e.g., first request 105, second request 115, $n^{th}$ request 125, etc.) from a user operating a user device (not shown in FIG. 1) and the compute device 101 can generate ZKPs for each request to be transmitted to the ZKP-enabled DLN for validation and/or verification. This is so, at least in part, to enable the requests to be validated and/or verified without disclosing contents of the requests for the requests to be executed. Alternatively or additionally, the requests can be generated by the processor 102 of the compute device 101 and in turn be used by the compute device 101 to generate ZKPs to be transmitted to the ZKP-enabled DLN 104 for validation and/or verification. In some implementations, the memory 103 can store instructions to cause the processor 102 to receive a first request 105. In some implementations, the first request 105 can be received at the processor 102 of the compute device 101 from a user. In some implementations, the processor 102 can be caused to generate the first request 105 and generate a first ZKP 107 to be transmitted to the ZKP-enabled DLN 104 to be validated and/or verified. The first request 105 can be or include any information about a transaction configured to be verified and/or executed by the ZKP-enabled DLN 104 or a set of computing nodes at the ZKP-enabled DLN 104.

A request can be, for example, information about a desired exchange of an asset, confirmation of an asset, confirmation about ownership of an asset, a trigger to cause the exchange, and/or the like. An exchange as described by the request can be or include a digital payment, an exchange of multiple digital assets, and/or the like. In some cases described herein, a "request" and a "transaction" can be used interchangeably. In some cases, the request can be or include a trigger to be executed and/or activated by a smart contract of the ZKP-enabled DLN 104 in response to a validation and/or verification of the request. The request can include a preimage of data that describes information of an identifier of an asset, identifier of an ownership of the asset (e.g. a user making a request and/or transaction), an identifier of a sender/recipient of the asset (e.g., parties involved in a transaction), an identifier of a hash value, and/or the like. The preimage can be in any length, size, format, and/or the like.

The first request 105 can contain a first preimage 106. The first preimage 106 can be consistent with any preimage as described herein. The first request 105 can be consistent with any request as described herein. For example, the first request 105 can include data that identifies or represents an asset, a price, ownership, and/or an owner related to the transaction related defined by the first request 105. In some implementations, the processor 102 can generate the first request 105 based on a user input. The first request 105 can be configured to be validated and/or verified for correctness by the ZKP-enabled DLN 104.

The ZKP-enabled DLN 104 can be or include multiple computing nodes where each computing node can include an instance and/or copy of the ZKP-enabled ledger 110. Each instance and/or copy of the ZKP-enabled ledger 110 can be updated, for example, by a smart contract based on the verification and/or execution of any requests, ZKPs, and/or transactions. Every update to a ZKP-enabled ledger (e.g., an instance and/or copy of the ZKP-enabled ledger 110) causes every other ZKP-enabled ledger to be updated accordingly. In some implementations, verification and/or execution can be performed via a smart contract of the ZKP-enabled DLN 104 and/or each smart contract of each computing node of the ZKP-enabled DLN 104. Each computing node can communicate amongst each other to validate and/or verify the request, ZKPs, transactions, and/or the like. In some cases, each smart contract of each computing node can automatically communicate with each other to automatically validate and/or verify any ZKPs, requests, and/or the like. In some implementations, the ZKP-enabled ledger 110 can be or include an instance and/or copy of a distributed ledger for a computing node from the multiple computing nodes comprising the ZKP-enabled DLN 104. For instance, any update for any ZKP-enabled ledger of any computing node causes the same update to every other ZKP-enabled ledger, including the ZKP-enabled ledgers of computing nodes that did not validate and/or verify ZKPs and/or requests responsible for the update.

The memory 103 can store instructions to cause the processor 102 to generate a first ZKP 107 based on the first request 105 and/or the first preimage 106. A ZKP can include an interactive ZKP, non-interactive ZKP, a ZK-succinct non-interactive argument of knowledge (ZK-SNARK), ZK-scalable transparent argument of knowledge (ZK-STARK), and/or the like. In some implementations, the processor 102 can generate the first ZKP 107 using a protocol with a set of criteria to be satisfied such as, for example a completeness of private user inputs (e.g., personal information, passwords, identifiers, email addresses, biometrics, etc.) and a completeness of user public inputs (e.g., data attesting to the user's association with the ZKP-enabled DLN 104, data attesting to a user's membership to a platform, internet protocol (IP) address, public-facing username, etc.). For instance, the user can provide user private data identifying the user and/or a user account associated with the user to interact with the ZKP-enabled DLN 104. The user can also provide the first request 105 to be validated and/or verified for correctness. The processor 102 can generate the first ZKP 107 to anonymize the first preimage 106 of the first request 105. For instance, the user and the user's information (e.g., the first request 105 and/or the first preimage 106) remains hidden and/or private. In some implementations, user public inputs refer to information that is revealed/known and used in the verification process of an associated ZKP.

A hash value (e.g., first hash value 108, second hash value 118, $n^{th}$ hash value 128, etc.) can be generated by the processor 102 inputting an associated preimage (e.g., first preimage 106, second preimage 116, $n^{th}$ preimage 126, etc.) into a hash function, to generate the hash value. This is so, at least in part, to anonymize the associated preimage (and associated request) via the hash value. The hash value can be or include any numeric value of a fixed length that uniquely identifies data (e.g., preimage). The hash value can be or include a digital signature. The digital signature can be or include a one-way hash or message digest of the associated preimage that is encrypted with a private key of the owner (or sender) of the associated request (e.g., the user).

The ZKP-enabled DLN 104 can include a set of computing nodes (not shown in FIG. 1) that communicate amongst each other to validate and/or verify the first ZKP 107. In some cases, each computing node can include representation of a smart contract that automatically communicates with each other to automatically validate and/or verify any ZKPs, requests, and/or the like. The memory 103 can store instructions to cause the processor 102 to transmit a representation of the first ZKP 107 to the ZKP-enabled DLN 104 to be automatically validated and/or verified by the computing nodes and/or a smart contract of each computing node and posted (e.g., stored, available for viewing by other devices on the ZKP-enabled DLN 104, etc.) on the ZKP-enabled ledger 110 of the ZKP-enabled DLN 104. In response to a successful validation, a smart contract of the ZKP-enabled DLN 104 can automatically execute the first request 105. The validation and/or verification of the first ZKP 107 also validates and/or verifies the first request 105, even if the first preimage 106 is anonymized and/or hidden from the computing nodes of the ZKP-enabled DLN 104. The ZKP-enabled DLN 104 can generate a first block 109 to be posted on the ZKP-enabled ledger 110 of the ZKP-enabled DLN 104 that includes a record of the first request 105, the first ZKP 107, and the first hash value 108 associated with the first request 105. In some implementations, the record of the first request 105 can be in the form of the first ZKP 107. The first hash value 108 can be used to confirm an existence of the first request 105.

With the first block 109 indicating a successful validation of the first ZKP 107 and execution of the first request 105, the memory 103 can store instructions to cause the processor 102 to receive a second request 115. The second request 115 can include any request as described herein, and be structurally similar to the first request 105. In some implementations, the second request 115 can be received from the same user and/or device that provided the first request 105. In some cases, the processor 102 can receive the second request 115 from a different user and/or device than the user providing the first request 105. In some implementations, the processor 102 can be caused to generate the second request 115 from the user operating the compute device 101. The second request 115 can contain a second preimage 116. The second preimage 116 can be consistent with any preimage as described herein. For example, the second request 115 can include data that identifies or represents an asset, a price, ownership, or owner related to the transaction related to the second request 115. The memory 103 can store instructions to cause the processor 102 to embed at least a portion of the first preimage 106 into the second preimage 116. In other words, at least a portion of the first preimage 106 of the first request 105 is included in the second preimage 116 of the second request 115. This is so that, at least in part, the at least a portion of the first preimage 106 is used and/or modified such that it is not substantially easily recoverable from the second preimage 116 of the second request 115 once that second preimage 116 and the second request 115 is generated. Additionally, by embedding at least the portion of the first preimage 106 into the second preimage 116, a validation and/or verification of the first request 105 including the first preimage 106 enables the validation and/or verification of the second request 115 including the second preimage 116 automatically, and off the ZKP-enabled DLN 104.

The memory 103 can store instructions to cause the processor 102 to generate a second ZKP 117 based on the second request 115 and/or the second preimage 116. In some implementations, the processor 102 can generate the second ZKP 117 using a protocol with a set of criteria, similar to that of the first ZKP 107, to be satisfied such as, for example a completeness of private user inputs (e.g., personal information, passwords, identifiers, email addresses, biometrics, etc.) and a completeness of user public inputs (e.g., data attesting to the user's (providing the second request 115) association with the ZKP-enabled DLN 104). For instance, the user providing the second request 115 (or requesting the second request 115 to be executed via the ZKP-enabled DLN 104) can provide user private data identifying the user and/or a user account associated with the user providing the second request 115 to interact with the ZKP-enabled DLN 104. The user can also provide the second request 115 to be validated and/or verified for correctness. The processor 102 can generate the second ZKP 117 to anonymize the second preimage 116 of the second request 115. For instance, the user and the user's information (e.g., the second request 115 and/or the second preimage 116) remains hidden and/or private. The second request 115 and/or the second preimage 116 can be hidden using a second hash value 118. The second hash value 118 can be generated similarly to generating the first hash value 108. For instance, the second hash value 118 can be used to anonymize the second preimage 116 by inputting the second preimage 116 into a hash function to generate the second hash value 118. The second hash value 118 can be generated by signing the second request 115 with a private key of the user associated with the second request 115, to produce a digital signature.

The memory 103 can store instructions to cause the processor 102 to transmit a representation the second ZKP 117 to the ZKP-enabled DLN 104 to be validated and/or verified by the computing nodes (or by the smart contracts of the computing nodes). In response to the validation and/or verification, the second ZKP 117 is configured to be posted (e.g., stored, available for viewing by other devices on the ZKP-enabled DLN 104, etc.) on the ZKP-enabled ledger 110 of the ZKP-enabled DLN 104, and to every other ZKP-enabled ledger of every other computing node of the ZKP-enabled DLN 104. As the second request 115 includes the at least a portion of the first preimage 106 in the second preimage 116 of the second request 115, the second ZKP 117 can be verified on the ZKP-enabled DLN 104, attesting to a correctness of both the first request 105 and the second request 115. Attesting to the correctness further includes confirming an existence of the second request 115 using the second hash value 118, which in turn, implicitly confirms the first request 105 using the first hash value 108.

Verifying the second request 115 can also include verifying the second request 115 using the second hash value 118, which contains the at least a portion of the first preimage 106 (which in turn implicitly verifies the first request 105 using the first hash value 108). In other words, confirmation of the existence and/or correctness of the second request 115, which is attested by the second ZKP 117, implicitly confirms the existence of and/or correctness of the first request 105, which is attested by the first ZKP 107. In some implementations, the ZKP-enabled DLN 104 can validate and/or verify the existence and/or correctness of the first request 105 based on the first ZKP 107, which attests to the existence and/or correctness of the first request 105. This is so, at least in part, to validate and/or verify any previous requests while maintaining anonymity. For instance, the first ZKP 107 is proof of the first request 105, and as the first ZKP 107 is recorded in the first block 109 on the ZKP-enabled DLN 104, the computing nodes of the ZKP-enabled DLN 104 do not need to validate and/or verify the first request 105 again as it was previously validated and/or verified in which the first ZKP 109 can attest to that.

The ZKP-enabled DLN 104 can generate a second block 119 to be posted on the ZKP-enabled ledger 110. The second block 119 can be posted on every other ZKP-enabled ledger of every other computing node of the ZKP-enabled DLN 104. For instance, any update for a ZKP-enabled ledger of a computing node causes the same update to every other ZKP-enabled ledger, including the ZKP-enabled ledgers of computing nodes that did not validate and/or verify the second ZKP 117 and/or the first ZKP 107.

In some implementations, the second block 119 can be generated and/or posted on the ZKP-enabled DLN 104 based on a successful validation and/or verification of the second ZKP 117 and/or the second request 115. In some implementations, the record of the second request 115 can be in the form of the second ZKP 117. The second hash value 118 can be used to confirm the existence of the second request 115. In response to the successful validation and/or verification of the second ZKP 117, a smart contract of the ZKP-enabled DLN 104 can execute the second request 115. In some implementations, the second block 119 can be linked to the first block 109 on the ZKP-enabled DLN 104. In some implementations, the second block 119 is not linked to the first block 109. In some instances when two blocks (e.g., first block 109 and second block 119) are not directly linked and/or are not related on the ZKP-enabled DLN 104, the requests (e.g., first request 105 and second request 115) can be executed sequentially. As such, each request can certify a correctness of a subsequent request.

In some implementations, the memory 103 can store instructions to further cause the processor 102 to receive multiple requests, each request containing a preimage that includes at least a portion of a preimage of a request that was received and/or generated prior to that request. As such, multiple subsequent ZKPs can be generated and multiple subsequent blocks can be posted on the ZKP-enabled DLN 104 and linked chronologically. For instance, the processor 102 can receive and/or generate an $n^{th}$ request 125 containing an $n^{th}$ preimage 126. The $n^{th}$ request 125 can be structurally similar to any request as described herein. The $n^{th}$ preimage 126 can contain at least a portion of a previous preimage from a previous request, such as, for example, at least a portion of an $(n-1)^{th}$ request (not shown in FIG. 1).

The processor 102 can generate an $n^{th}$ ZKP 127 and transmit the $n^{th}$ ZKP 127 to the ZKP-enabled DLN 104 to be validated and/or verified by the computing nodes. The $n^{th}$ ZKP 127 can be validated and/or verified by validating and/or verifying the correctness and/or existence of any previously requests (e.g., the first request 105, the second request 115, etc.), as the $n^{th}$ preimage 126 includes the at least a portion of the $(n-1)^{th}$ request, and the second preimage 116 includes the at least a portion of the first preimage 106. The $n^{th}$ request 125 can also be validated and/or verified using an $n^{th}$ hash value 128. In response to the validation and/or verification of the $n^{th}$ ZKP 127, which attests to the correctness and/or the existence of any previous requests, the smart contract of the ZKP-enabled DLN 104 can be configured to automatically execute the $n^{th}$ request 125. The ZKP-enabled DLN 104 can generate an $n^{th}$ block 129, which can be linked to a previous block such as, for example, $(n-1)^{th}$ request.

On some implementations, the each request (e.g., first request 105, second request 115, $n^{th}$ request 125, etc.) can be validated and/or verified and executed by the smart contract of the ZKP-enabled DLN 104 in response to a validation and/or verification of each request's associated ZKP (e.g., first ZKP 107 for the first request 105, second ZKP 117 for the second request 115, $n^{th}$ ZKP 127 for the $n^{th}$ request 125, etc.), where each ZKP is indirectly validated and/or verified on the ZKP-enabled DLN 104 by the computing nodes (or the smart contracts of the computing nodes). This is so, at least in part, to reduce computation overhead at the ZKP-enabled DLN 104 and/or the computing nodes by verifying each ZKP, which validates its associated request, and using its associated hash value (e.g., first hash value 108, second hash value 118, $n^{th}$ hash value 128, etc.) to indirectly confirm the existence of the prior linked requests. Additionally, a ZKP can enable a user to record its request while keeping a preimage of the request anonymous. In some implementations, the processor 102 can generate multiple requests that the ZKP-enabled DLN 104, via smart contracts, can execute sequentially over time.

Figure 2:
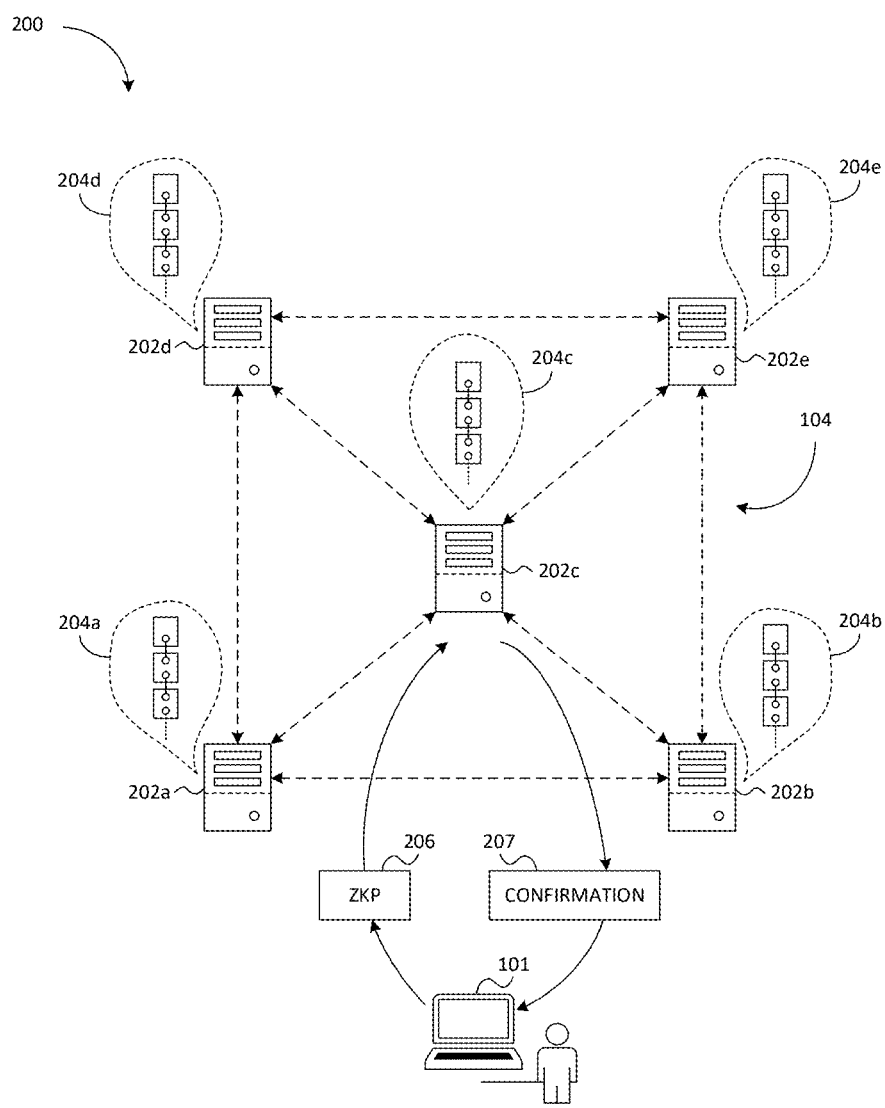
FIG. 2 is a schematic illustration of system for forming verifiably correct zero-knowledge proofs from prior transactions, according to an embodiment.

FIG. 2 is a schematic illustration of system 200 that includes a ZKP-enabled DLN 104 for forming verifiably correct zero-knowledge proofs from prior transactions, according to an embodiment. The ZKP-enabled DLN 104 can be, for example, a blockchain network and include multiple computing nodes 202a-202e. Each computing node can be configured to communicate amongst each other via a peer-to-peer (P2P) connection. In some implementations, the computing nodes 202a-202e can include compute devices structurally similar to a compute device 101 described previously in FIG. 1. In some implementations, the P2P connections can be provided by wired and/or wireless communications systems or networks (not shown) such as, for example, intranet, local area networks (LANs), wide area networks (WANs), etc., utilizing wireless communication protocols or standards such as WiFi®, LTE®, WiMAX®, and/or the like.

In some embodiments, the ZKP-enabled DLN 104 can include (e.g., store) self-executing codes or smart contracts that are configured to execute upon validation and/or verification of ZKPs associated with requests interacting on the ZKP-enabled DLN 104. For example, some or all of the computing nodes 202a-202e can include copies of a smart contract that self-executes upon validation and/or verification. In some implementations, the computing nodes 202a-202e can communicate amongst each other to arrive at a consensus for a ZKP 206. In some implementations, a computing node(s) 202a-202e can have a smart contract(s) that self-executes, and produces a result determining whether or not the ZKPs are correct and to be transmitted to the rest of the computing nodes 202a-202e for confirmation.

In some embodiments, the ZKP-enabled DLN 104 can be linked to one or more oracles (not shown in FIG. 2) or data feeds that provide external data to the ZKP-enabled DLN 104. For example, an oracle can be a hardware (e.g., computing node) or software (stored and/or executing on hardware) that is configured to gather or receive data from systems external to the ZKP-enabled DLN 104 (e.g., sensors, web API, ZKP-enabled DLN 104, user devices, etc.) and provide the collected data or information to a smart contract on the ZKP-enabled DLN 104. In some implementations, as discussed above, self-executing codes or smart contracts can automatically execute upon realization of conditions of correctness and/or existence of a request associated with the ZKP 206, and the oracles may provide the data that can be used to evaluate whether the conditions are met. The smart contract, upon receiving the information, may self-execute after determining validation and/or verification of ZKP 206 for the request has been fulfilled. In some embodiments, the oracles may facilitate for the smart contracts to send data out to external systems. For example, a smart contract can be configured to verify the ZKP 206 provided by a user at a certain date and time, and send out the verification results and/or a confirmation 207 of execution/validation of a request associated with the ZKP 206 back to the user (or other users and/or compute devices) when the verification is complete.

In some embodiments, at least a significant number of the computing nodes 202a-202e can include copies of a distributed ledger (e.g., the ZKP-enabled ledger 110 of FIG. 1) 204a-204e onto which ZKPs (including the ZKP 206) that occur on the network are recorded (e.g., stored, synchronized, updated). For instance, not all computing nodes will have the same and/or updated version of the distributed ledger 204a-204e. All of the computing nodes will eventually have the same and/or updated version of the distributed ledger 204a-204e in response to a consensus formed by a sufficient and/or majority number of computing nodes (e.g., consensus in confirming whether or not the ZKP 206 is correct). As such, all of the distributed ledgers 204a-204e are configured to be synched.

The recording of the ZKPs on the distributed ledger 204a-204e can occur when some significant number (e.g., at least 50%, at least 75%, at least 90%, at least 99%, etc.) of the computing nodes 202a-202e, or a subset thereof, agree on the validity of the ZKPs. The distributed ledger 204a-204e can be immutable in response to a consensus being obtained from a significant number of computing nodes 202a-202e. In some implementations, the distributed ledger 204a-204e can be nearly immutable in the sense that to alter the distributed ledger 204a-204e, at least this significant number of the computing nodes 202a-202e would have to agree, which can be increasingly difficult when the number of computing nodes 202a-202e is large (and the distributed ledger 204a-204e gets longer).

Figure 3:
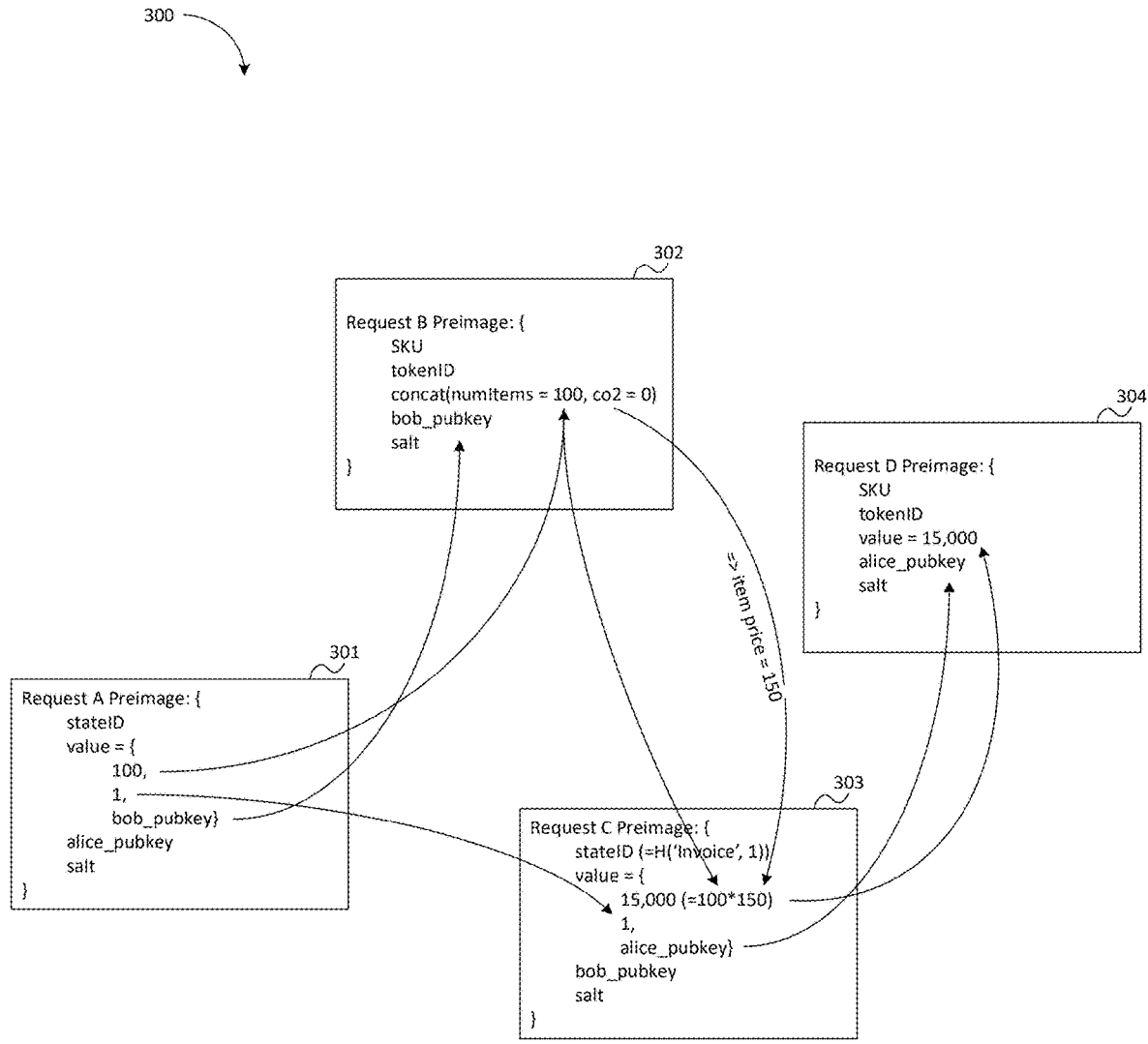
FIG. 3 is a diagrammatic illustration of chronological requests, according to an embodiment.

FIG. 3 is a diagrammatic illustration of chronological requests 300, according to an embodiment. FIG. 3 depicts a request A 301, a request B 302, a request C 303, and a request D 304. The request A 301 can include a preimage that contains various information. The request B 302 can include a preimage that is embedded with at least a portion of the preimage of the request A 301. For instance, the preimage of the request A 301 can include a value of 100 that is used in a concatenation function in the preimage of the request B 302.

At least a portion of the preimage in the request B 302 can be embedded in the preimage of the request C 303. For instance, a number of items ("numItems"), such as, for example, 100, and price for the item when the item has a zero $CO_2$ value ("co2") such as, for example, 150, can be embedded in a mathematical equation shown in the preimage of request 303, to produce a value of 15,000. At least a portion of the preimage in the request C can be embedded in a preimage of the request D 304. For instance, the value of 15,000 and a public key from the preimage of the request C is embedded in the preimage of the request D 304 as shown in FIG. 3.

Note that FIG. 3 is one example, and variations can exist. For example, in some implementations, where a first preimage is embedded in a second preimage, a third preimage can embed the second preimage but not the first preimage. As another example, in some implementations, where a first preimage is embedded in a second preimage, a third preimage can embed both the first preimage and the second preimage.

Figure 4:
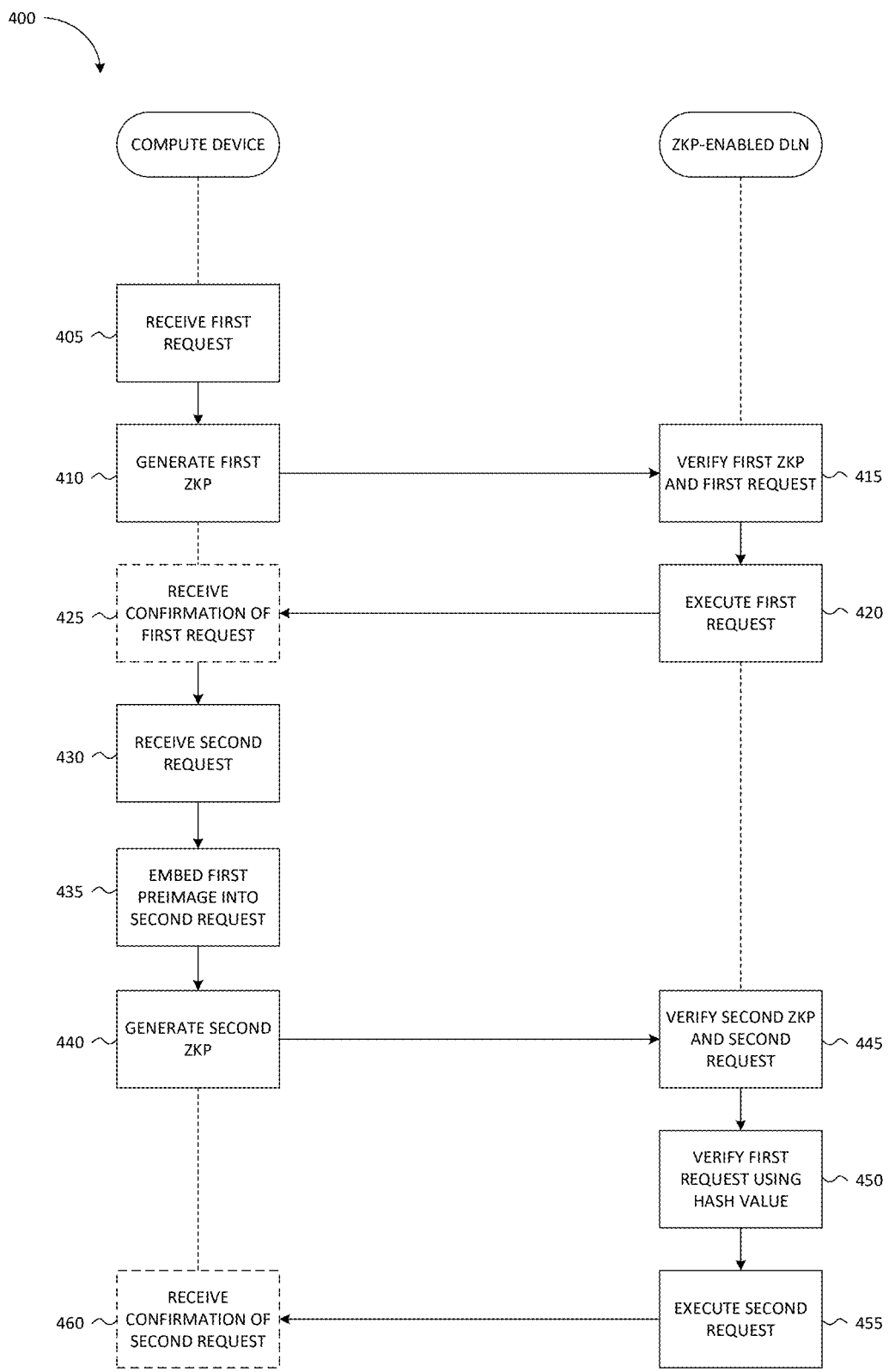
FIG. 4 is a flow diagram of a method for forming verifiably correct zero-knowledge proofs from prior transactions, according to an embodiment.

FIG. 4 is a flow diagram of a method 400 for forming verifiably correct zero-knowledge proofs from prior transactions, according to an embodiment. The method 400 can include various steps occurring, for example, at a processor, a compute device (e.g., compute device 101 of FIG. 1) and/or a ZKP-enabled DLN (e.g., ZKP-enabled DLN 104 of FIG. 1) of FIG. 1. At 405, the method 400 includes receiving, by a processor (e.g., processor 102 of FIG. 1) of a compute device (e.g., compute device 101 of FIG. 1), a first request (e.g., first request 105 of FIG. 1). The first request can be or based on input received from a user. The first request can be consistent with any first request as described herein.

At 410, the method 400 includes generating, by the processor of the compute device, a first ZKP (e.g., first ZKP 107 of FIG. 1), based on the first request. The first ZKP can be consistent with any first ZKP as described herein. The first ZKP can be generated to anonymize a preimage (e.g., preimage 106 of FIG. 1) of data describing the first request 405. In some implementations, the method 400 can include generating the first ZKP via an optional proof generator (e.g., proof generator 111 of FIG. 1) located at the compute device. In some implementations, the method 400 can include transmitting the first ZKP to the ZKP-enabled DLN to be validated and/or verified to enable an execution of the first request.

At 415, the method 400 includes verifying and/or validating, at the ZKP-enabled DLN, the first ZKP and/or the first request. The ZKP-enabled DLN can include multiple computing nodes configured to validate for correctness and/or existence of the first request attested by the first ZKP, using a hash value (e.g., hash 108 of FIG. 1) associated with the first request. In some implementations, the computing nodes can include and/or generate smart contracts configured to, when executed, automatically validate and/or verify the first ZKP and/or the first request.

At 420, the method 400 includes executing the first request, in response to the validation and/or the verification of the first ZKP and/or the first request. The method 400 can include automatically executing, via the smart contract(s), the first request. In some implementations, the method 400 can include generating a block (e.g., first block 109 of FIG. 1) including data of the first ZKP and/or the first request to be posted on the ZKP-enabled DLN or a distributed ledger (e.g., a ZKP-enabled DL as shown in FIG. 1) of the ZKP-enabled DLN.

At 425, the method 400 can optionally include receiving, by the processor of the compute device a confirmation of the execution and/or validation of the first transaction. The confirmation can be transmitted to the user.

At 430, the method 400 includes receiving, by the processor of the compute device, a second request (e.g., second request 115 of FIG. 1). The second request can be consistent with any second request as described herein. The second request can include a preimage of data describing the second request.

At 435, the method 400 can include embedding, by the processor of the compute device, at least a portion of the first preimage into a second preimage (e.g., preimage 116 of FIG. 1) of the second request. This is so, at least in part, to create a link between the first request and the second request. In other words, at least a portion of preimage of an initial transaction is included in the preimage of a subsequent transaction, and that the at least a portion of the preimage of the initial transaction is used and/or modified such that it is not substantially easily recoverable from the preimage of the subsequent transaction once that preimage and the subsequent transaction is formed. This is so, at least in part, to create a link between the initial transaction and the subsequent transaction that appears unrelated. While the two transactions appear unrelated, they can be linked on a distributed ledger.

At 440, the method 400 includes generating, by the processor of the compute device, a second ZKP (e.g., second ZKP 117 of FIG. 1), based on the second request including the embedded portion of the first preimage. The second ZKP can be consistent with any ZKP as described herein. In some implementations, the method 400 can include generating the second ZKP via the proof generator. In some implementations, the method 400 can include transmitting the second ZKP to the ZKP-enabled DLN to be verified for execution of the second request.

At 445, the method 400 includes validation and/or verifying, at the ZKP-enabled DLN, the second ZKP and/or the second request. Validating and/or verifying the second ZKP can be consistent with any validation and/or verifying of the second ZKP as described herein. In some implementations, the method 400 can include confirming the correctness and/or the existence of the second request to validate and/or verify the second ZKP, without compromising the privacy of the first request or the second request.

At 450, the method 400 includes verifying, at the ZKP-enabled DLN, the first request using a hash value (e.g., hash 108 of FIG. 1) associated with the first request. For instance, as the first request is linked with the second request based on the at least a portion of the preimage of the first request being embedded in the second preimage, verifying the second request and/or the second ZKP requires validation of correctness and/or existence of previous transactions including the first request using the hash value associated with the first request.

At 455, the method 400 includes executing, via a smart contract and at the ZKP-enabled DLN, the second request. In some implementations, the method 400 can include generating a second block (e.g., second block 119 of FIG. 1) to be posted on the ZKP-enabled DLN and/or the distributed ledger of the ZKP-enabled DLN, where the second block is linked to the first block.

At 460, the method 400 can optionally include receiving, at the compute device, a confirmation of the execution and/or the verification of the second request and/or second ZKP.

FIG. 5 shows a flowchart of a method 500 to generate ZKPs based on requests, according to an embodiment. In some implementations, method 500 is performed by a processor (e.g., processor 102 of FIG. 1).

At 502, a first request (e.g., first request 105 of FIG. 1) is received that includes a first preimage (e.g., preimage 106 of FIG. 1) of data from the first request. At 504, a first zero-knowledge proof (ZKP) (e.g., first ZKP 107 of FIG. 1) is generated based on the first request. The first ZKP is configured to anonymize the first preimage and be posted on a ledger (e.g., ZKP-enabled ledger 110 of FIG. 1) of a zero-knowledge proof (ZKP)-enabled distributed ledger-based network (DLN) (e.g., ZKP-enabled DLN 104 of FIG. 1). At 506, a second request (e.g., second request 115 of FIG. 1) is received that includes a second preimage (e.g., preimage 116 of FIG. 1) of data from the second request. At 508, at least a portion of the first preimage is embedded in the second request. At 510, a second ZKP (e.g., second ZKP 117 of FIG. 1) is generated based on the second request. The second ZKP is configured to anonymize the second preimage and be posted on the ledger of the distributed ledger ZKP-enabled DLN. At 512, the first ZKP and the second ZKP is transmitted to the ZKP-enabled DLN.

In some implementations, one or more of 504, 506, 508, 510, and/or 512 can be performed automatically (e.g., without human intervention) in response to completion of 502, 504, 506, 508, and/or 510, respectively, manually (e.g., with human intervention) in response in response to completion of 502, 504, 506, 508, and/or 510, respectively, or a combination thereof.

Some implementations of method 500 further include receiving, from the ZKP-enabled DLN, a confirmation of an execution of the second request in response to a verification of the second ZKP.

Some implementations of method 500 further include causing execution of a smart contract to validate at least one of the first ZKP or the first request based on a hash value (e.g., hash 108 of FIG. 1) associated with the first request.

Some implementations of method 500 further include: causing execution of a smart contract to validate at least one of the first ZKP or the first request based on a hash value (e.g., hash 108 of FIG. 1) associated with the first request; and in response to the validating of the least one of the first ZKP or the first request, causing execution of the smart contract to execute the first request.

In some implementations of method 500, the first request is associated with a first transaction at a first time and the second request is associated with a second transaction at a second time after the first time.

Some implementations of method 500 further include receiving a third request (e.g., $n^{th}$ request 125 of FIG. 1) that includes a third preimage (e.g., preimage 126 of FIG. 1) of data from the third request. Some implementations of method 500 further include embedding at least a portion of the first preimage and at least a portion of the second preimage in the third request. Some implementations of method 500 further include generating a third ZKP (e.g., nth ZKP 127 of FIG. 1) based on the third request. The third ZKP is configured to anonymize the third primage and be posted on a ledger of the distributed ledger ZKP-enabled DLN.

Some implementations of method 500 further include receiving a third request (e.g., $n^{th}$ request 125 of FIG. 1) that includes a third preimage (e.g., preimage 126 of FIG. 1) of data from the third request. Some implementations of method 500 further include embedding at least a portion of the second preimage in the third request. Some implementations of method 500 further include generating a third ZKP (e.g., $n^{th}$ ZKP 127 of FIG. 1) based on the third request. The third ZKP is configured to anonymize the third primage and be posted on a ledger of the distributed ledger ZKP-enabled DLN.

In some implementations of method 500, the first request is associated with an asset and the first preimage is associated with at least one of an identifier of the asset, an ownership of the asset, an identifier of a sender associated with the asset, an identifier of a recipient associated with the asset, or a hash value (e.g., hash 108 of FIG. 1) associated with the first request.

In some implementations of method 500, the first request is associated with a user. Some implementations of method 500 further include receiving, based on input from the user, public information associated with the user and private information associated with the user. The first ZKP can be generated at 506 based on the private information and the public information.

Figure 6B:

FIGS. 6A-6B show a flowchart of a method 600 to execute a request in response to verifying a ZKP, according to an embodiment. In some implementations, method 600 is performed by a processor(s) (e.g., processor(s) of a compute device(s) in ZKP-enabled DLN 104 of FIG. 1).

At 602, a first ZKP (e.g., first ZKP 107 of FIG. 1) associated with a first request (e.g., first request 105 of FIG. 1) and a second ZKP (e.g., second ZKP 117 of FIG. 1) associated with a second request (e.g., second request 115 of FIG. 1) is received at a ZKP-enabled DLN (e.g., ZKP-enabled DLN 104 of FIG. 1). The first request includes a first preimage (e.g., preimage 106 of FIG. 1) of data from the first request, and the second request includes at least a portion of the first preimage associated with the first request and a second preimage (e.g., preimage 116 of FIG. 1). The first request and the second request can be linked based on the at least a portion of the first preimage. At 604, the second ZKP is automatically (e.g., without human intervention) verified. In some implementations, as shown in FIG. 6B, 604 can include: at 604a, verifying the second request based on a hash value (e.g., hash 118) associated with the second request; and at 604b, verifying a transaction based on the verification of the second request and a hash value (e.g., hash 108) associated with the transaction and associated with the first ZKP to verify the second ZKP. In some implementations of 604b, (1) the transaction is associated with the first request, (2) the hash value associated with the transaction and the first ZKP verifies (e.g., the existence of) the first request, and (3) the second request validates and/or verify correctness of the transaction. Returning to FIG. 6A, at 606, the second request associated with the second ZKP is automatically (e.g., without human intervention) executed in response to automatically verifying the second ZKP at 604.

In some implementations, one or more of 604*a*, 604*b*, and/or 606 can be performed automatically (e.g., without human intervention) in response to completion of 602, 604*a*, and/or 604*b*, respectively, manually (e.g., with human intervention) in response in response to completion of 602, 604*a*, and/or 604*b*, respectively, or a combination thereof.

Some implementations of method 600 further include inputting the second preimage to a hash function to generate the hash value associated with the second request.

Some implementations of method 600 further include receiving, at the ZPK-enabled DLN, a third ZKP (e.g., $n^{th}$ ZKP 127 of FIG. 1) associated with a third request (e.g., nth request 125 of FIG. 1). The third request can include at least a portion of the second preimage and a third preimage (e.g., preimage 126 of FIG. 1) of data from the third request. The third request and the second request can be linked based on the at least a portion of the second preimage. Some implementations of method 600 further include automatically verifying the third ZKP. Some implementations of method 600 further include automatically executing the third request in response to the automatic verifying of the third ZKP.

In some implementations of method 600, the first request is associated with an asset and the first preimage is associated with at least one of an identifier of the asset, an ownership of the asset, an identifier of a sender associated with the asset, or an identifier of a recipient associated with the asset.

Some implementations of method 600 further include executing, at the ZKP-enabled DLN, the second request via a smart contract.

FIG. 7 shows a flowchart of a method 700 to execute smart contracts to execute requests in response to verifying ZKPs and the requests, according to an embodiment. In some implementations, method 700 is performed by a processor(s) (e.g., processor(s) of a compute device(s) in ZKP-enabled DLN 104 of FIG. 1).

At 702, a representation of a first ZKP (e.g., first ZKP 107 of FIG. 1) and a representation of a first request (e.g., first request 105 of FIG. 1) that includes a first preimage (e.g., preimage 106 of FIG. 1) of data associated with the first request is received via a processor of a compute device included in a ZKP-enabled DLN (e.g., ZKP-enabled DLN 104 of FIG. 1) and from a remote compute device (e.g., compute device 101 of FIG. 1). At 704, the representation of the first ZKP and the first request is verified via the processor. At 706, in response to the verifying of the representation of the first ZKP and the first request at 704, a first smart contract is automatically (e.g., without human intervention) caused, via the processor, to execute the first request. At 708, a representation of a second ZKP (e.g., second ZKP 117 of FIG. 1) and a representation of a second request (e.g., second request 115 of FIG. 1) that includes the first preimage and a second preimage (e.g., preimage 116 of FIG. 1) of data associated with the second request is received via the processor and from the remote compute device. The first request and the second request can be linked based on the first preimage. At 710, the representation of the second ZKP and the second request is verified via the processor. At 712, in response to the verifying of the representation of the second ZKP and the second request, a second smart contract is automatically (e.g., without human intervention) caused, via the processor, to execute the second request.

In some implementations, one or more of 704, 706, 708, 710, and/or 712 can be performed automatically (e.g., without human intervention) in response to completion of 702, 704, 706, 708, and/or 710, respectively, manually (e.g., with human intervention) in response in response to completion of 702, 704, 706, 708, and/or 710, respectively, or a combination thereof.

In some implementations of method 700, the second ZKP is configured anonymize the first preimage and the second preimage.

Some implementations of method 700 further include sending, via the processor and to the remote compute device and in response to the execution of the first request at 706, a confirmation confirming execution of the first request. Some implementations of method 700 further include sending, via the processor and to the remote compute device and in response to the execution of the second request at 712, a confirmation confirming execution of the second request.

In some implementations of method 700, the verifying at 704 includes verifying the representation of the first ZKP and the first request using a hash function associated with the first request.

Some implementations of method 700 further include receiving, via the processor and from the remote compute device, a representation of a third ZKP (e.g., $n^{th}$ ZKP 127 of FIG. 1) and a representation of a third request (e.g., Nth request 125 of FIG. 1) that includes the second preimage of data and a third preimage (e.g., preimage 126 of FIG. 1) of data associated with the third request. The third request and the second request can be linked based on the second preimage.

Some implementations of method 700 further include verifying, via the processor, the representation of the second ZKP and the second request. Some implementations of method 700 further include, in response to the verifying the representation of the second ZKP and the second request, automatically (e.g., without human intervention) causing, via the processor, a third smart contract to execute the third request.

In some implementations of method 700, the first request is associated with an asset and the first preimage is associated with at least one of an identifier of the asset, an ownership of the asset, an identifier of a sender associated with the asset, or an identifier of a recipient associated with the asset.

It is to be noted that any one or more of the aspects and embodiments described herein can be conveniently implemented using one or more machines (e.g., one or more compute devices that are utilized as a user compute device for an electronic document, one or more server devices, such as a document server, etc.) programmed according to the teachings of the present specification. Aspects and implementations discussed above employing software and/or software modules can also include appropriate hardware for assisting in the implementation of the machine executable instructions of the software and/or software module.

Such software can be a computer program product that employs a machine-readable storage medium. A machine-readable storage medium can be any medium that is capable of storing and/or encoding a sequence of instructions for execution by a machine (e.g., a compute device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software can also include information (e.g., data) carried as a data signal on a data carrier, such as a carrier wave. For example, machine-executable information can be included as a data-carrying signal embodied in a data carrier in which the signal encodes a sequence of instruction, or portion thereof, for execution by a machine (e.g., a compute device) and any related information (e.g., data structures and data) that causes the machine to perform any one of the methodologies and/or embodiments described herein.

Examples of a compute device include, but are not limited to, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a compute device can include and/or be included in a kiosk.

All combinations of the foregoing concepts and additional concepts discussed herewithin (provided such concepts are not mutually inconsistent) are contemplated as being part of the subject matter disclosed herein. The terminology explicitly employed herein that also can appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments can be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments cannot have been presented for a specific portion of the innovations or that further undescribed alternate embodiments can be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments can be utilized and functional, logical, operational, organizational, structural and/or topological modifications can be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For example, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general-purpose processor, a central processing unit (CPU), a microprocessor, a digital signal processor (DSP), a controller, a microcontroller, a state machine and so forth. Under some circumstances, a "processor" can refer to an application specific integrated circuit (ASIC), a programmable logic device (PLD), a field programmable gate array (FPGA), etc. The term "processor" can refer to a combination of processing devices, e.g., a combination of a DSP and a microprocessor, multiple microprocessors, one or more microprocessors in conjunction with a DSP core or any other such configuration.

The term "memory" should be interpreted broadly to encompass any electronic component capable of storing electronic information. The term memory can refer to various types of processor-readable media such as random-access memory (RAM), read-only memory (ROM), non-volatile random-access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" can refer to one or more programs, routines, sub-routines, functions, procedures, etc. "Instructions" and "code" can comprise a single computer-readable statement or many computer-readable statements.

The term "modules" can be, for example, distinct but interrelated units from which a program may be built up or into which a complex activity may be analyzed. A module can also be an extension to a main program dedicated to a specific function. A module can also be code that is added in as a whole or is designed for easy reusability.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules can include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts can be embodied as one or more methods, of which at least one example has been provided. The acts performed as part of the method can be ordered in any suitable way. Accordingly, embodiments can be constructed in which acts are performed in an order different than illustrated, which can include performing some acts simultaneously, even though shown as sequential acts in illustrative embodiments. Put differently, it is to be understood that such features can not necessarily be limited to a particular order of execution, but rather, any number of threads, processes, services, servers, and/or the like that can execute serially, asynchronously, concurrently, in parallel, simultaneously, synchronously, and/or the like in a manner consistent with the disclosure. As such, some of these features can be mutually contradictory, in that they cannot be simultaneously present in a single embodiment. Similarly, some features are applicable to one aspect of the innovations, and inapplicable to others.

In addition, the disclosure can include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein can be implemented in a manner that enables a great deal of flexibility and customization as described herein.

All definitions, as defined and used herein, should be understood to control over dictionary definitions, definitions in documents incorporated by reference, and/or ordinary meanings of the defined terms.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:
1. A system, comprising:
an apparatus that includes:
a processor; and
a memory operatively coupled to the processor, the memory storing instructions to cause the processor to:
receive a first request that includes a first preimage of data from the first request;
one-way hash the first preimage to generate a first hash value;
encrypt the first hash value using a private key of a sender associated with the first request to generate a first digital signature;
generate a first zero-knowledge proof (ZKP) that (1) anonymizes the first preimage via the first digital signature and (2) based on the first request;
send a representation of the first ZKP to a zero-knowledge proof (ZKP)-enabled distributed ledger-based network (DLN) to post the first ZKP on a ledger of the ZKP-enabled DLN;
receive a second request that includes (1) a second preimage of data from the second request and (2) at least a portion of the first preimage, the first request and the second request linked based on the portion of the first preimage;
embed the at least a portion of the first preimage in the second request to produce an embedded second request;
one-way hash the second preimage to generate a second hash value;
encrypt the second hash value using a private key of a sender associated with the second request to generate a second digital signature;
generate a second ZKP (1) that anonymizes the second preimage based on the second digital signature and (2) based on the embedded second request; and
send a representation of the second ZKP to the ZKP-enabled DLN to post the second ZKP on the ledger of the ZKP-enabled DLN; and
a node of the ZKP-enabled DLN, the node configured to automatically verify the second ZKP by:
verifying the second request based on the second digital signature; and
in response to verifying the second request, automatically executing the second request associated with the second ZKP.

2. The system of claim 1, wherein the memory stores instructions to further cause the processor to:
receive, from the ZKP-enabled DLN, a confirmation of an execution of the second request in response to a verification of the second ZKP by the node of the ZKP-enabled DLN.

3. The system of claim 1, wherein the memory stores instructions to further cause the processor to:
in response to validating least one of the first ZKP or the first request, cause execution of a smart contract to execute the first request.

4. The system of claim 1, wherein the first request is associated with a first transaction at a first time and the second request is associated with a second transaction at a second time after the first time.

5. The system of claim 1, wherein the memory stores instructions to further cause the processor to:
receive a third request that includes a third preimage of data from the third request;
embed at least a portion of the first preimage and at least a portion of the second preimage in the third request to produce an embedded third request;
one-way hash the third preimage to generate a third hash value;
encrypt the third hash value using a private key of a sender associated with the third request to generate a third digital signature; and
generate a third ZKP based on the embedded third request, the third ZKP configured to anonymize the third preimage based on the third digital signature and be posted on the ledger of the ZKP-enabled DLN by the node of the ZKP-enabled DLN.

6. The system of claim 1, wherein the memory stores instructions to further cause the processor to:
receive a third request that includes a third preimage of data from the third request;
embed at least a portion of the second preimage in the third request to produce an embedded third request;
one-way hash the third preimage to generate a third hash value;
encrypt the third hash value using a private key of a sender associated with the third request to generate a third digital signature; and
generate a third ZKP based on the embedded third request, the third ZKP configured to anonymize the third preimage based on the third digital signature and be posted on the ledger of the ZKP-enabled DLN by the node of the ZKP-enabled DLN.

7. The system of claim 1, wherein the first request is associated with an asset and the first preimage is associated with at least one of an identifier of the asset, an ownership of the asset, an identifier of a sender associated with the asset, an identifier of a recipient associated with the asset, or the first hash value associated with the first request.

8. The system of claim 1, wherein the first request is associated with a user and the memory stores instructions to further cause the processor to:
receive, based on input from the user, public information associated with the user and private information associated with the user, the first ZKP generated based on the private information and the public information.

9. The system of claim 1, wherein:
a third ZKP is associated with a third request, the third request including at least a portion of the second preimage and a third preimage of data from the third request, the third request and the second request linked based on the at least the portion of the second preimage;
the third ZKP is automatically verified by the node at the ZKP-enabled DLN; and
the third request is automatically executed in response to the automatic verifying of the third ZKP by the node.

10. The system of claim 1, wherein the first request is associated with an asset and the first preimage is associated with at least one of an identifier of the asset, an ownership of the asset, an identifier of a sender associated with the asset, or an identifier of a recipient associated with the asset.

11. The system of claim 1, wherein a smart contract is a first smart contract, and the second request is executed via a second smart contract.

12. The system of claim 1, wherein:
the first request and the second request are received from a remote compute device; and
the memory further stores instructions to cause the processor to:
verify the first ZKP and the first request;
in response to the first ZKP and the first request being verified, automatically cause a first smart contract to execute the first request;
verify the second ZKP and the second request; and
in response to the second ZKP and the second request being verified, automatically cause a second smart contract to execute the second request.

13. The system of claim 12, wherein the second ZKP is configured anonymize the first preimage and the second preimage.

14. The system of claim 12, wherein the memory further stores instructions to cause the processor to:
send, to the remote compute device and in response to the first request being executed, a confirmation confirming execution of the first request; and
send, to the remote compute device and in response to the second request being executed, a confirmation confirming execution of the second request.

15. The system of claim 12, wherein verifying the first ZKP and the first request includes verifying the first ZKP and the first request using a hash function associated with the first request.

16. The system of claim 12, wherein the memory further stores instructions to cause the processor to:
receive, from the remote compute device, a third ZKP and a third request that includes the second preimage of data and a third preimage of data associated with the third request, the third request and the second request linked based on the second preimage;
verify the second ZKP and the second request; and
in response to the second ZKP and the second request being verified, automatically cause a third smart contract to execute the third request.

17. The system of claim 12, wherein the first request is associated with an asset and the first preimage is associated with at least one of an identifier of the asset, an ownership of the asset, an identifier of a sender associated with the asset, or an identifier of a recipient associated with the asset.

18. The system of claim 1, wherein the ZKP-enabled DLN is a public DLN.

19. A method, comprising:
receiving, via an apparatus, a first request that includes a first preimage of data from the first request;
one-way hashing, via the apparatus, the first preimage to generate a first hash value;
encrypting, via the apparatus, the first hash value using a private key of a sender associated with the first request to generate a first digital signature;
generating, via the apparatus, a first zero-knowledge proof (ZKP) that (1) anonymizes the first preimage via the first digital signature and (2) based on the first request;
sending, via the apparatus, a representation of the first ZKP to a zero-knowledge proof (ZKP)-enabled distributed ledger-based network (DLN) to post the first ZKP on a ledger of the ZKP-enabled DLN;
receiving, via the apparatus, a second request that includes (1) a second preimage of data from the second request and (2) at least a portion of the first preimage, the first request and the second request linked based on the portion of the first preimage;
embedding, via the apparatus, the at least a portion of the first preimage in the second request to produce an embedded second request;
one-way hashing, via the apparatus, the second preimage to generate a second hash value;
encrypting, via the apparatus, the second hash value using a private key of a sender associated with the second request to generate a second digital signature;
generating, via the apparatus, a second ZKP (1) that anonymizes the second preimage based on the second digital signature and (2) based on the embedded second request;
sending, via the apparatus, a representation of the second ZKP to the ZKP-enabled DLN to post the second ZKP on the ledger of the ZKP-enabled DLN; and
automatically verifying, via a node of the ZKP-enabled DLN, the second ZKP by:
verifying the second request based on the second digital signature; and
in response to verifying the second request, automatically executing the second request associated with the second ZKP.

* * * * *